United States Patent [19]

Dadds

[11] Patent Number: 4,857,937

[45] Date of Patent: Aug. 15, 1989

[54] DATA ELEMENT POSITION INDICATION

[75] Inventor: Alan F. Dadds, Hartfield, England

[73] Assignee: U.S. Philips Corporation, New York, N.Y.

[21] Appl. No.: 132,508

[22] Filed: Dec. 14, 1987

[51] Int. Cl.[4] .......................... H01Q 3/00; G01S 5/02

[52] U.S. Cl. .................................... 342/377; 342/378; 342/417; 342/445

[58] Field of Search ............... 342/377, 378, 379, 417, 342/420, 443, 445; 364/575, 734

[56] References Cited

U.S. PATENT DOCUMENTS

| | | | |
|---|---|---|---|
| 3,643,075 | 2/1972 | Hayes | 342/377 |
| 3,747,098 | 7/1973 | Kirkpatrick et al. | 342/377 |
| 4,014,023 | 3/1977 | Kirkland | 342/377 |
| 4,229,739 | 10/1980 | Smith | 342/377 |

FOREIGN PATENT DOCUMENTS 2192764 1/1988 United Kingdom .

*Primary Examiner*—Thomas H. Tarcza
*Assistant Examiner*—David Cain
*Attorney, Agent, or Firm*—Robert J. Kraus

[57] ABSTRACT

In, for example, a passive direction-finding radio receiver employing a multi-beam antenna which has e.g. ninety-six feeds which form a corresponding number of overlapping reception beams, the output signal amplitudes of the various feeds can be compared with a reference to yield a sequence of binary digits, e.g. as shown in FIG. 2. The position of a radio source is given by the position in the sequence of the center of the largest group of "1"s. In order to quickly determine this position the sequence is subjected repeatedly to a processing operation in which each "1" which does not have "1"s as its two immediate neighbors is changed to a "0", thereby repeatedly stripping the two end "1"s off each group of "1"s until none remain. The required position is that of the single "1" or pair of "1"s present immediately before all have become "0"s.

5 Claims, 3 Drawing Sheets

DATA ELEMENT POSITION INDICATION

BACKGROUND OF THE INVENTION

This invention relates to a method of generating a signal indicative of the position, within a sequence of data elements of first and second kinds, of that element or pair of elements which lies at the centre of the or each largest group of elements of the first kind. The invention also relates to apparatus for carrying out such a method.

It is sometimes necessary to determine, within a sequence of data elements of first and second kinds, the position of that element or pair of elements which lies at the centre of the or each largest group of elements of the first kind. For example, in passive direction-finding radio receivers which employ an antenna of a multibeam type, for example a so-called "Luneberg lens antenna" as described in an article by K. E. Cassel entitled "A Broad Band ESM/ECM Antenna with 360° Multibeam Coverage" in Military Microwaves Conference Proceedings, 1982, the antenna has multiple feeds which form a large number of overlapping reception beams which give multidirectional (possibly even omnidirectional) coverage. The sensitivity S of the antenna as a function of direction 0 may be of the form illustrated in FIG. 1 of the accompanying diagrammatic drawings, where the successive curves 1, 2, 3 etc relate to the respective successive feeds. If this is the case and, for example, a radio source is located in the direction $0_1$, outputs, albeit of mutually different amplitudes, will be obtained from feeds 5–12 (possibly even more iff appreciable side-lobes are present), with the highest outputs coming from feed 8 and 9. The position $0_1$ of the source could, of course, be ascertained by comparing the output amplitudes of the various feeds, thereby ascertaining that in fact the highest amplitudes are coming from feeds 8 and 9 (corresponding to directions $0_2$ and $0_3$ respectively). However, this becomes impracticable when the number of feeds is large, for example ninety-six, and is also liable to lead to inaccuracies with sources of differing frequency. A better way when the number of feeds is large is to ascertain whether the output from each given feed is above or below a suitable threshold level (which level is the same for each feed) giving in effect a sequence of binary digits corresponding to the respective feeds. Such a sequence may be, for example, as shown in FIG. 2 of the accompanying drawings, where it is assumed that the antenna is omnidirectional, that there are ninety-six feeds the directional pattern corresponding to each of which includes a pair of side lobes of appreciable amplitude, that the source is in the direction $0_1$ (FIG. 1), and that a binary "1" corresponds to a signal amplitude from the corresponding feed which is above the threshold. If now the feed(s) corresponding to the centre of the largest group of "1"s is/are ascertained, this/these will in turn be an indication of the direction $0_1$ of the source. In the absence of the side-lobes, and hence of the "1"s corresponding to feeds 22–24 and 89–91, this could be done by finding the average of the numbers in the sequence of all the feeds to which a binary "1" corresponds, i.e. $(5+6+7+8+9+10+11+12)/8=8.5$. However such an averaging process can take quite an appreciable amount of time, and moreover only gives an accurate result in the absence of side-lobes. It is an object of the invention to mitigate this disadvantage.

SUMMARY OF THE INVENTION

The invention provides a method of generating a signal indicative of the position, within a sequence of data elements of first and second kinds, of that element or pair of elements which lies at the centre of the or each largest group of elements of the first kind, said method comprising the step of changing each element of the first kind which has an element of the second kind as an immediate neighbour in the sequence into an element of the second kind, repeating said step until all elements of the sequence are of the second kind, and generating a signal indicative of the position(s) of the element(s) of the first kind present immediately before the carrying out of that said step which results in all elements of the sequence being of the second kind.

It has now been recognized that the centre of e.g. the largest group of binary "1"s in the sequence of FIG. 2 can be located rapidly by repeatedly stripping a "1" off each end of each group of "1"s until no "1"s remain, the position of the said centre corresponding to the position of the last "1" or pair of "1"s remaining before none at all remain. If this process is applied to the sequence of FIG. 2, first bits 5 12, 22, 24, 89 and 91 will be changed to "0", then bits 6, 11, 23 and 90 will be changed to "0", then bits 7 and 10 will be changed to "0", leaving only bits 8 and 9. Such a process may take, for example, only approximately three clock pulse periods whereas the averaging process referred to above may take approximately ninety-six and, more over, give an incorrect result because of the presence of the side-lobes.

If, for example, the sequence of FIG. 2 is in fact derived from the output feeds of a multibeam radio antenna and the feed or associated circuitry corresponding to for example bit 10 becomes faulty so that this bit is a "0" whereas it should be a "1", an erroneous result will be obtained on carrying out the method so far defined. In order to overcome this disadvantage the aforesaid sequence may be formed from an initial sequence of data elements of said first and second kinds by changing each element of said initial sequence which is of the second kind and which has an element of the first kind as an immediate neighbour in said initial sequence into an element of the first kind. If the initial sequence is, for example, that shown in FIG. 2 but with bit 10=0, then changing each "0" which has a "1" as an immediate neighbour into a "1" will result in bits 4, 10, 13, 21, 25, 88 and 92 being changed into a "1". This can be referred to as "1-spreading". If the resulting sequence is then subjected to 1-stripping operations as previously set forth eventually only bits 8 and 9 will be "1", as required.

The 1-stripping operations can be conveniently carried out by means of apparatus comprising first storage means for said sequence, which storage means has a storage location corresponding to each said data element and also a clock signal input, a data input corresponding to each of said data elements, which input is coupled to an input of the corresponding storage location, a logic gate corresponding to each pair of alternate elements in said sequence, which gate has inputs coupled to outputs of the storage locations corresponding to the elements of the relevant pair and is constructed to generate at an output thereof a signal indicative of whether data elements stored in the storage locations corresponding to the elements of the relevant pair are both of the first kind, which output is coupled to an input of the storage location corresponding to the element which lies within the sequence between the elements of the relevant pair, second storage means having a storage location corresponding to each storage location of the first storage means and also a clock signal input, a coupling from an output of each storage location of the first storage means to an input of the corresponding storage location of the second storage means, a clock signal generator circuit having an inhibit signal input and clock signal outputs coupled to the clock signal inputs of the first and second storage means, and a further logic gate having inputs coupled to outputs of the storage locations of the first storage means and an output coupled to said inhibit signal input, said further logic gate being constructed to apply an inhibit signal to said inhibit signal input when the data elements stored in the storage locations of the first storage means are all of the second kind, said second storage means being arranged to respond to the application thereto of clock pulses from said clock signal generator circuit by storing the current contents of the first storage means and said first storage means being arranged to respond to the application thereto of successive clock pulses from said clock signal generator circuit by initially storing a sequence of data elements presented to said data inputs and then storing in any of its storage locations currently storing a data element of the first kind a data element of the second kind should the said logic gate which has an output coupled to an input of the relevant storage location indicate that the data elements stored in the pair of storage locations corresponding thereto are not both of the first kind.

Each storage location of the first storage means may comprise a respective J-K function flip-flop, the said logic gate which has an output coupled to an input thereof having its output coupled to the K-function input thereof and the corresponding data input being coupled to the J-function input thereof via a further logic gate, these further logic gates having control inputs coupled to a control signal output of said clock pulse generator circuit and said clock pulse generator circuit being arranged to apply a control signal to said control signal output fro blocking said further logic gates when a sequence of data elements presented to said data inputs has been stored in said J-K function flip-flops.

A priority encoder may be provided having an input corresponding to and coupled to an output of each storage location of the second storage means, which encoder is constructed to generate a number in binary form corresponding to the first position in the sequence for which the corresponding storage location of the second storage means is storing a data element of the first kind.

If such a priority encoder is provided, the apparatus may include an auxiliary logic gate corresponding to each pair of adjacent elements in said sequence, which gate has inputs coupled to outputs of the storage locations of the second storage means corresponding to the relevant pair and is constructed to generate at its output a signal indicative of whether the storage locations to which its inputs are coupled are both storing a data element of the first kind, the outputs of said auxiliary logic gates being coupled to respective inputs of a further logic gate which is constructed to produce an output signal indicative of whether any said auxiliary logic gate is indicating that the storage locations to which its inputs are coupled are both storing a data element of the first kind, so that said output signal constitutes a least significant bit for said number in binary form.

If the "1-spreading" previously referred to is required to be carried out the apparatus may include an OR-function gate correpsonding to each element in said sequence, which gate has an output coupled to the data input corresponding to the relevant data element, a first input for a respective data element of said initial sequence, and further inputs coupled to the first inputs of the said OR-function gates (if present) corresponding to the immediately preceding data element in said sequence and to the immediately succeeding data element in said sequence respectively.

BRIEF DESCRIPTION OF THE DRAWING

An embodiment of the invention will now be described, by way of example, with reference to the accompanying diagrammatic drawings, in which.

DESCRIPTION OF THE PREFERRED EMBODIMENT

Figure 3:
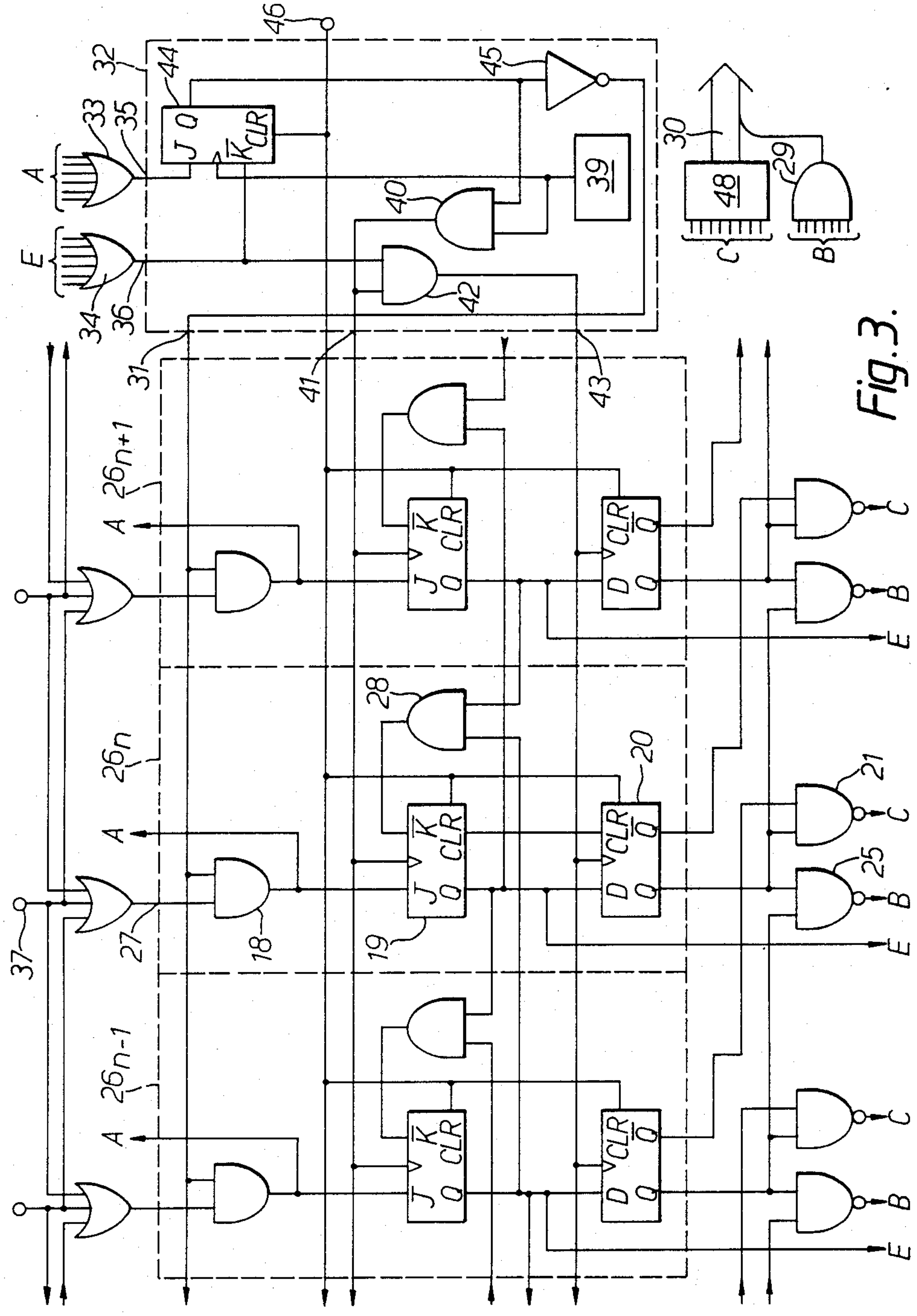

In FIG. 3 apparatus for generating a signal representative of the position, within a sequence of binary digits (bits), of that bit or pair of bits of value "1" which lies at the centre of the or each largest group of bits of value "1" comprises a number N of substantially identical subcircuits 26, of which only three, $26_{n-1}$ $26_n$ and $26_{n+1}$, are shown in detail, and of which only one, $26_n$, will be described in detail. N is equal to the number of bits in the entire sequence. The subcircuit $26_n$ has a data input 27 for the relevant bit of the sequence, which input feeds one input of a two-input AND gate 18. The output of AND gate 18 is connected to the J-input of a J-K flip-flop 19 the Q-output of which is connected to the D-input of a D-type flip-flop 20. The $\overline{K}$-input of flip-flop 19 is fed from the output of an AND gate 28 the two inputs of which are fed from the Q-outputs of the J-K flip-flops corresponding to flip-flop 19 in the subcircuits $26_{n-1}$ and $26_{n+1}$ corresponding to the immediately adjacent bits in the sequence. The Q-output of flip-flop 20 may, if desired, be connected to one input of each of two-input NAND gates 21 and 25 respectively. The other inputs of NAND gates 21 and 25 (if present) are fed with the inverted and non-inverted values respectively of the signal appearing at the Q-output of the D-type flip-flop corresponding to flip-flop 20 in the subcircuit $26_{n-1}$ corresponding to the immeidately preceding bit in the sequence. The output of NAND-gate 21, denoted by the letter "C", is, if present, connected to a corresponding input of an N-input priority encoder 48. Similarly, the output of NAND-gate 25, denoted by the letter "B", is, if present, connected to a corresponding input of an N-input AND-gate 29 the output of which, if present, supplies a least-significant bit to the (active low) multibit parallel output 30 from encoder 48 (if present). The other input of AND-gate 18 is fed from a control signal output 31 of a controllable clock pulse generator and control signal generator circuit 32. The output of AND-gate 18, denoted by the letter "A", is also connected to a corresponding input of an N-input OR-gate 33, and the Q-output of J-K flip-flop 19, denoted by the letter "E" is also connected to a corresponding input of an N-input OR-gate 34. The outputs of the OR-gates 33 and 34 are connected to an input 35 and an inhibit signal input 36 respectively of generator circuit 32. The input 27 of sub-circuit $26_n$ may, if desired, be fed from an input terminal 37 of a three-input OR-gate 38 the other two inputs of which are fed from the inputs, corresponding to input 37, of similarly optional OR-gates corresponding to OR-gate 38 feeding the subcircuits $26_{n-1}$ and $26_{n+1}$ respectively. The "clear" inputs CLR of the flip-flops 19 and 20, and also of a flip-flop 44, are connected to a reset input 46.

Generator circuit 32 comprises a clock pulse generator 39 which feeds one input of an AND-gate 40. The output of AND-gate 40 is connected to a clock signal output 41 of generator circuit 32 and also to an input of an AND-gate 42. The output of AND-gate 42 is connected to a clock signal output 43 of generator circuit 32. The output of pulse generator 32 is also connected to the clock input of the J-K flip-flop 44 the Q-output of which is connected to the second input of AND-gate 40. The inputs 35 and 36 of the generator circuit 32 are connected to the J-input of flip-flop 44 and to both the $\overline{K}$-input of flip-flop 44 and the other input of AND-gate 42 respectively. The Q-output of flip-flop 44 is also connected to the output 31 of generator circuit 32 via an inverter 45. The outputs 41 and 43 of the generator circuit 32 are connected to the clock inputs of the J-K flip-flops 19 in all the subcircuits 26 and to the clock inputs of the D-type flip-flops 20 in all the subcircuits 26 respectively.

On the assumption that the sequence of binary digits which the apparatus of FIG. 3 is required to process is closed, i.e. cyclic, the connections to the left from subcircuit $26_1$ will be to the corresponding connections to the right from subcircuit $26_N$. On the other hand, if said sequence is not of this kind the apparatus will have to be modified slightly. More particularly, as far as the subcircuit $26_1$ is concerned, the connections which would otherwise go from the inputs of the OR-gate corresponding to OR-gate 38 (if present) to the similar OR-gate in non-existant subcircuit $26_0$ will have to be omitted, the AND-gate corresponding to AND-gate 28 will have to be omitted, the K-input of the flip-flop corresponding to flip-flop 19 being connected instead to a logic "0" potential, the NAND-gate corresponding to NAND-gate 21 (if present) will have to be replaced by a direct connection from the Q-output of the flip-flop corresponding to flip-flop 20, and the NAND-gate corresponding to NAND-gate 25 (if present), together with the corresponding input of AND-gate 29, will have to be omitted. As far as the subcircuit $26_N$ is concerned, the connectons which would otherwise go from the inputs of the OR-gate corresponding to OR-gate 38 (if present) to the similar OR-gate in non-existant subcircuit $26_{N+1}$ will have to be omitted, the AND-gate corresponding to AND-gate 28 will have to be omitted, the K-input of the flip-flop corresponding to flip-flop 19 being connected instead to a logic "0" potential, and the connections from the Q and $\overline{Q}$ outputs of the flip-flip corresponding to flip-flop 20 to the non-existant subcircuit $26_{N+1}$ will have to be omitted.

On the assumption that the optical gates 38 together with their interconnections are not in fact provided the apparatus of FIG. 3 operates as follows, the inputs 27 of the various sub-circuits 26 being fed, for example, with binary digits from the outputs of respective comparators which compare the outputs signal amplitudes from respective feeds from a multi-beam antenna with a reference or threshold, as referred to in the preamble.

Figure 2:
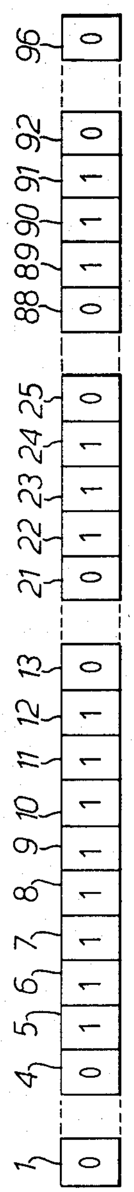
Figure 1:
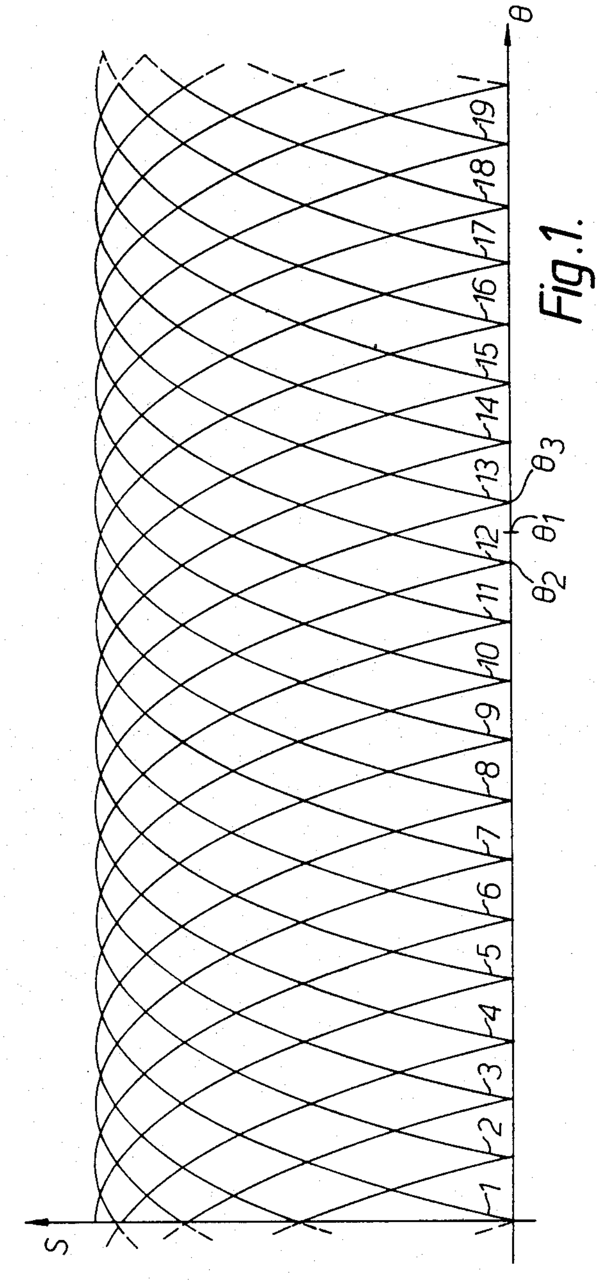
FIG. 1 shows an example of how the sensitivity S of a multibeam antenna may vary as a function of direction 0, as previously referred to, FIG. 2 illustrates a possible result of thresholding the output amplitudes of the respective feeds of a multibeam antenna, as previously referred to, FIG. 3 is a block diagram of an embodiment of the invention.

Initially a reset pulse is applied to input 46, causing all the flip-flops to be reset to the state in which their Q-outputs are logic "0". Suppose that initially the antenna is not picking up a signal, so that all the input 27 are at logic "0". The outputs of OR-gates 33 and 34 are thus both logic "0". Because $J=\overline{K}=0$ for flip-flop 44 it remains in its reset state, disabling AND-gate 40 but enabling AND gates 18 via inverter 45. The apparatus is thus quiescent, but with AND-gates 18 enabled. Suppose that now the antenna picks up a signal which results in the bits of the sequence shown in FIG. 2 being applied to respective ones of the inputs 27. The resulting binary "1" (from OR-gate 33 allows flip-flop 44 to change state on the leading edge of the next clock pulse from generator 39, enabling AND-gate 40 and hence causing the input sequence present on the outputs of the AND-gates 18 to be writted into first storage means comprising the flip-flops 19 (whose $\overline{K}$-inputs are initially all logic "0") and disabling the AND-gates 18. The former operation gives rise to a logic "1" from OR-gate 34 and the latter operation gives rise to a logic "0"from OR-gate 33, causing flip-flop 44 to be held in the set state and AND-gate 42 to be enabled, the latter causing the input sequence to also be written into the flip-flops 20 (which form second storage means).

When the next leading edge of a clock pulse is generated by generator 39 the contents of the flip-flops 19 are again writted into the flip-flops 20. As far as the flip-flops 19 are concerned, those which are in the set state and have a flip-flop 19 in the set state as an immediate neighbour on both sides, i.e. the flip-flops in subcircuits $26_{6-11,23,90}$, (see FIG. 2) remain in the set state because, for them, $J=0$ and $\overline{K}=1$. Those flip-flops 19 which are in the reset state remain in that state because, for them, $J=0$ and $\overline{K}=1$ or 0, and the others, i.e. those in the subcircuits $26_{5,12,22,24,89,91}$, are reset, because for them $J=0$ and $K=0$. A logic "1" is therefore stripped off both ends of each group of logic "1"s in the sequence.

When the next leading edge of a clock pulse is generate by generator 39 similar operations occur: the current contents of the flip-flops 19 are written into flip-flops 20 and, this time, the flip-flops 19 in subcircuits $26_{6,11,23,90}$ are reset. Eventually, of the flip-flops 19, only those in the subcircuits $26_8$ and $26_9$ remain set (these corresponding to the centre of the largest group of binary "1"s in the original sequence) and, on the next clock pulse, these too are reset after their states have been transferred to the corresponding flip-flops 20. The resetting of these last two flip-flops results in a logic "0" from OR-gate 34, blocking AND-gate 42 and hence the further application of clock pulses to the flip-flops 20. Furthermore, when the next clock pulse is generated by generator 39, flip-flop 44 is reset (its J and K inputs are now both logic "0") blocking AND-gate 40. The end result, therefore, is that the flip-flops 20 in subcircuits $26_8$ and $26_9$ are in the set state, and all the other flip-flops 20 are in the reset state, indicating that the position of the pair of binary "1"s which lies at the centre of the largest group of binary "1"s in the sequence of FIG. 2 coincides with that of bits 8 and 9 in the sequence. The NAND gates 21 and 25, the priority encoder 48 (which may, for example, comprise several cascaded integrated circuits available under the type number 74148) and the AND-gate 29 (if present) are provided to transform this information into a more convenient form. It will be seen that the NAND gate 25 in a given sub-circuit $26_n$ produces a logic "0" if and only if the flip-flops 20 in both subcircuit $26_n$ and subcircuit $26_{n-1}$ are both set, i.e. if the end result is a pair of flip-flops 20 being in the set state, rather than just one. Moreover the NAND gate 21 in a given subcircuit $26_n$ produces a logic "0" if and only if the flip-flops 20 in subcircuits $26_n$ and $26_{n-1}$ are in the set and the reset state respectively. Thus a logic "0" appears at the output C of that subcircuit of which the flip-flop 20 contains the left-most "1" in the sequence after the 1-stripping operations have been completed, and a logic "0" occurs at the output B of the immediately neighbouring subcircuit higher in the sequence if the flip-flop 20 in that subcircuit too contains a binary "1". The priority encoder 48 (which in the present example operates with inverted logic) responds to the outputs C by generating an output in inverted binary notation giving the number of that subcircuit which is generating the left-most "0", i.e. in the present example subcircuit 8, and AND gate 29 adds a least significant bit to this (in the present example binary "0" because of the inverted notation used) because output B of subcircuit 9 is producing a logic "0". Thus the number in inverted binary notation on parallel output 30 is 8.5 as required. It should be noted that if bit 12 in the original sequence had been binary "0", meaning that the centre of the largest group of 1's was located actually at bit 8, rather than between bits 8 and 9, only the flip-flop 20 in subcircuit $26_8$ would have been in the set state after the 1-stripping operations, resulting in all gates 25, and hence also gate 29, generating a logic 1, so that the number in inverted binary notation on output 30 would in that case have been 8.0 as required.

As mentioned previously, if the bits applied to the inputs 27 are in fact derived from the outputs of respective comparators which compare the output signal amplitudes from respective feeds from a multi-beam antenna with a reference or threshold, it may be that one or more of these feeds or associated circuitry becomes faulty, with the result that the or each corresponding comparator produces a binary "0" rather than a binary "1". In, for example, a passive-direction-finding radio receiver this could lead to a quite erroneous result. For example, the sequence shown in FIG. 2 could be altered by the tenth bit being a binary "0" instead of a binary "1" so that, after the 1-stripping operation, only that flip-flop 20 corresponding to bit 7 remains in the set state, resulting in the number "7" appearing at ouput 30. The OR-gates 38 in FIG. 3 may be provided to at least reduce the magnitude of such an error, the comparator outputs being applied to the respective inputs 37 of these gates rather than direct to the subcircuit inputs 27. It will be seen that a given gate 38 will apply a logic "1" to the input 27 of the corresponding subcircuit 26n if a logic "1" is applied to its own input 37 or to the inputs 37 of the gates corresponding to either of the subcircuits $26_{n-1}$ and $26_{n+1}$. Thus the input sequence is transformed by adding a binary "1" to both ends of each group of "1"s, prior to its application to the inputs 27. With the faulty sequence quoted above, therefore, bit 10 will be corrected to a "1", albeit at the expense of also changing bits 4, 13, 21, 25, 88 and 92 to "1"s. However the latter merely means that one more clock pulse will have to occur before the correct results appears at output 30.

Although in the apparatus of FIG. 3 an array of J-K flip-flops and AND-gates is employed to carry out the 1-stripping operations it will be evident that this is not the only possibility. As an alternative the sequence of bits at inputs 27 may be applied to the parallel data input of both a first and a second shift register of length N and hence be stored in both. If the data outputs of each pair of corresponding stages in the two registers are connected to respective inputs of a corresponding two-input AND gate, then the resulting array of AND gates will initially generate the input sequence. If now the contents of the two shift registers are shifted in mutually opposite directions the groups of "1"s in the sequence as it appears at the outputs of the array of AND-gates will have pairs of "1"s successively stripped from their ends, in an analogous manner to the operations achieved by means of the J-K flip-flops in FIG. 3. If these shifts are continued until none of the AND gates produces a logic 1 and then a single shift in the reverse direction is carried out, the array of AND-gates will produce exactly the same sequence of binary digits as is finally generated by the D-type flip-flops 20 in FIG. 3. However, the arrangement employing J-K flip-flops is preferred because difficulties are liable to be encountered when the two-shift-register arrangement is used to process sequences in which two groups of logic "1"s are close together; when this is the case it may be that one group in one shift register starts to "overlap" the other group in the other shift register before it has ceased to overlap the one group in the other shift register.

It will be appreciated that the array of flip-flops 20 of FIG. 3 will, if the largest group of "1"s in the initial sequence is accompanied by one or more other groups of the same size, produce output signals corresponding to each of these groups. However, the priority encoder 48 (if present) will only respond to one of these groups. The chance of this occurring can, if desired, be reduced by replacing the single gate 29/encoder 48 arrangement shown by a plurality of such arrangements each operating on signals derived from a different portion of the array of flip-flops 20 and collectively covering the whole array. If will also be appreciated that if the largest group of "1"s in the initial sequence consists of an even number, and the sequence also contains another group consisting of one less "1", the array of flip-flops 20 will produce an output signal corresponding to this other group in addition to one corresponding to the largest group. However, this need not be a disadvantage, at least when the apparatus is employed in passive direction-finding apparatus, because in such an application the second largest group, because it contains only one less "1", will be of substantially equal interest.

Figure 4:
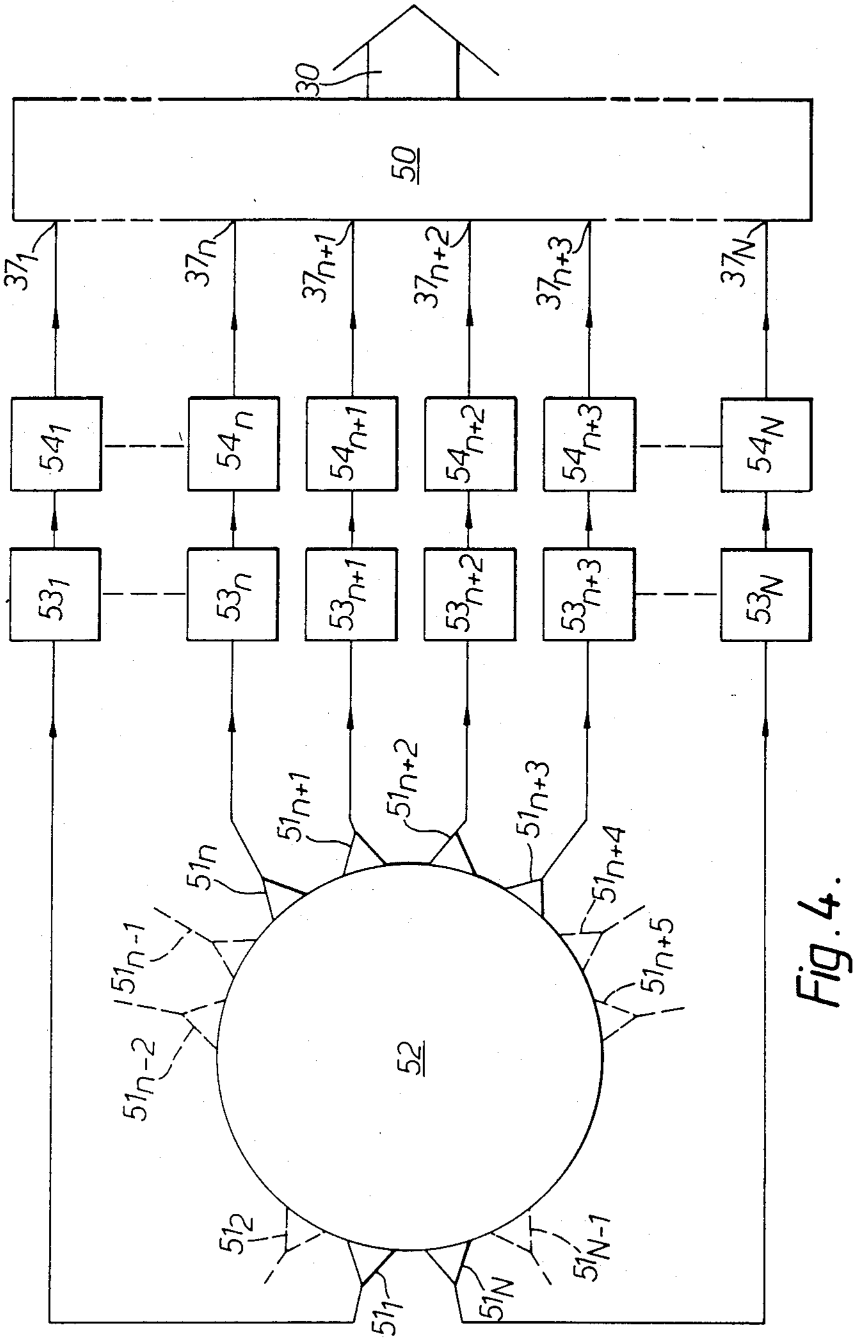
FIG. 4 shows how the embodiment of FIG. 3 may be incorporated in a direction finding radion receiver.

FIG. 4 shows how the embodiment of the invention shown in FIG. 3 may be incorporated in a passive direction-finding radio receiver. In FIG. 4, the apparatus of FIG. 3 is denoted by reference numeral 50 and the inputs $37_1$–$37_N$ thereof are supplied with data bits derived from respective feeds $51_1$–$51_N$ from a multi-beam antenna 52, for example of the Luneberg lens type, by means of respective amplitude detectors $53_1$–$53_N$ and respective comparators $54_1$–$54_N$. In practice, of course, at least an amplifier (which may be logarithmic) will be included in the coupling from each feed 51 to the corresponding comparator 54.

I claim:

1. Apparatus for determining the direction of a signal received by an antenna having a multiplicity of feed elements arranged in a sequential order for receiving energy beams from a multiplicity of directions, said apparatus comprising:

a. signal strength determining means coupled to the feed elements for producing, for each feed element, either a first value data signal when a beam received by the feed element has a magnitude greater than a predetermined magnitude or a second value data signal when the beam received by the feed element has a magnitude smaller than said predetermined magnitude;

b. signal storage means coupled to the signal strength determining menas for storing the data signals in a sequence representative of the order of arrangement of the feed elements;

c. data processing means coupled to the signal storage means for determing where in the sequence of stored data signal is the center of the largest group of sequential first value data signals, said processing means including:

(1) means for finding all groups of successive first value data signals;

(2) means for processing the data signals in sequence to change the value of each first value data signal which is adjacent in sequence to a second value data signal to a second value data signal, said processing being repeated until at least one first value data signal of the largest group remains and all first value data signals outside of said largest group have been changed to second value data signals, said at least one data signal having a position in the sequence of storged data signals representing the direction of the signal received by the antenna.

2. Apparatus as in claim 1 where the feed elements are arranged to receive overlapping beams.

3. Apparatus as in claim 1 or 2 where each signal strength determining means comprises a comparator for comparing the magnitude of a signal produced by the respective feed element with a reference level.

4. A method for determining the direction of a signal received by an antenna having a multiplicity of feed elements arranged in a sequential order for receiving energy beams from a multiplicity of directions, said method including the steps of:

a. producing, for each feed element, either a first value data signal when a beam received by the feed element has a magnitude greater than a predetermined magnitude or a second value data signal when the beam received by the feed element has a magnitude smaller than said predetermined magnitude;

b. storing the data signals in a sequence representative of the order of arrangement of the feed elements;

c. determining where in the sequence of stored data signals is the center of the largest group of sequential first value data signals, said determination being achieved by:

(1) finding all groups of successive first value data signals;

(2) processing the data signals in sequence to change the value of each first value data signal which is adjacent in sequence to a second value data signal to a second value data signal, said processing being repeated until at least one first value data signal of the largest group remains and all first value data signals outside of said largest group have been changed to second value data signals, said at least one data signal having a position in the sequence of stored data signals representing the direction of the signal received by the antenna.

5. A method as in claim 4 where the data signals are produced by comparing the magnitude of signals produced by the feed elements with a reference level.

* * * * *